UNITED STATES PATENT OFFICE 2,023,773

WATERINSOLUBLE AZODYESTUFFS

Gerhard Schrader, Opladen, near Cologne-on-the-Rhine, Germany, assignor to General Aniline Works, Inc., New York, N. Y., a corporation of Delaware No Drawing. Application November 6, 1933, Serial No. 696,909. In Germany November 19, 1932

12 Claims. (Cl. 260—86)

The present invention relates to new water-insoluble azodyestuffs and to fibre dyed with the said dyestuffs, more particularly it relates to dyestuffs which may be represented by the general formula:

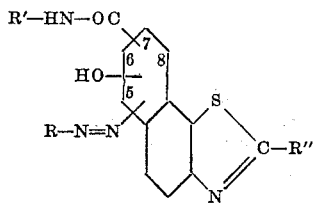

wherein R stands for a radical of the aromatic series, such as a radical of the benzene, naphthalene and anthraquinone series, R' stands for a radical of the benzene or naphthalene series, R'' stands for alkyl or for a radical of the aromatic series, wherein R, R' and R'' may bear non-solubilizing substituents, such as alkyl, alkoxy, halogen and the nitro group, and wherein the group —N=N—R is attached to the naphthalen nucleus in the 5- or 8-position, the hydroxy group standing in ortho-position to the group —N=N—R, and the group —CO—NH—R' standing in ortho-position to the hydroxy group.

My new dyestuffs are obtainable by coupling in substance or on the fibre a diazotized aromatic primary amine free from a substituent inducing solubility in water with a coupling component of the general formula:

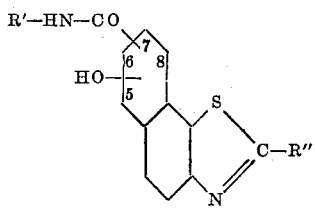

wherein R' and R'' means the same as stated above, and wherein the hydroxy group stands in the 6- or 7-position and the group —R'—NH—CO in the 7- or 6-position.

Those dyestuffs produced in substance are generally yellow to red to blue to black powders, insoluble in water, suitable for preparing lakes, while those produced on the fibre, especially the cellulosic fibre, according to the usual printing process or according to the method of preparing ice colors, generally yield yellow to red to blue to black shades of good fastness to light.

The manufacture of the coupling components used in the manufacture of my new dyestuffs has been described and claimed in my copending application for Letters Patent Serial No. 646,031, filed December 6, 1932.

The invention is illustrated by the following examples, without being limited thereto:

*Example 1.*—2 grams of naphtho-7'-hydroxy-6'carbonyl-(1''-amino-2''-methylbenzene)-(1',2', 5,4-)-2-methylthiazole are dissolved in the usual manner with the aid of caustic soda and some hot water, and the solution is made up with water to one litre. 50 grams of cotton yarn are impregnated in this solution at 30° C. for half an hour, squeezed and, without drying, introduced for about half an hour into one litre of a developing bath prepared in the usual manner from 3 grams of 1,4-diethoxy-2-benzoylamino-5-aminobenzene. The cotton is then rinsed, soaped, again rinsed and dried. A greenish-blue of excellent fastness to boiling and light is thus obtained. The dyestuff corresponds to the following formula:

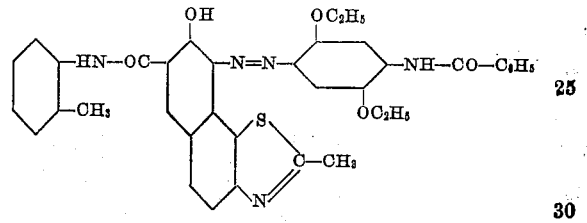

*Example 2.*—50 grams of cotton yarn are impregnated as described in Example 1 and introduced for half an hour into one litre of a diazo solution prepared in the usual manner from 1.62 grams of 2,5-dichloro-4-benzoylamino-1-aminobenzene. After rinsing, soaping in a boiling bath, again rinsing and drying, there is obtained a bluish-red of good fastness to chlorine and boiling and excellent fastness to light. The dyestuff corresponds to the following formula:

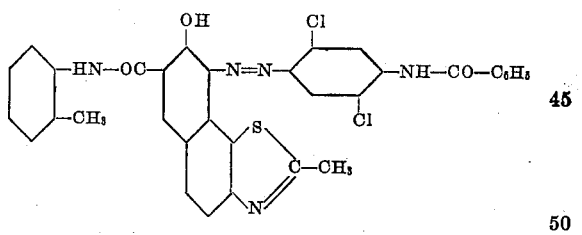

*Example 3.*—50 grams of cotton yarn are impregnated as described in Example 1 and introduced for half an hour into one litre of a diazo solution prepared from 2.56 grams of 1-methyl-4-methoxy-2-benzoylamino-5-aminobenzene.

After rinsing, soaping in a boiling bath, again rinsing and drying, there is obtained a bluish-violet of good fastness to boiling and chlorine and excellent fastness to light. The dyestuff corresponds to the following formula:

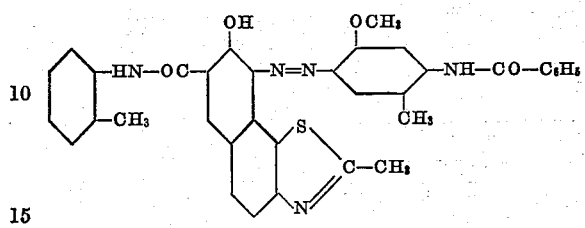

*Example 4.*—2 grams of naphtho-6'-hydroxy-7'-carbonyl-(1''-amino-2''-methylbenzene)-(1',2',5,4-)-2-methylthiazole are dissolved in the usual manner with the aid of caustic soda and some hot water, and the solution is made up with water to one litre. 50 grams of cotton yarn are impregnated in this solution at 30–40° C. for half an hour, rinsed and, without drying, introduced into one litre of a developing bath prepared in the usual manner from 3.5 grams of 4-amino-diphenylamine-4'-azo-1''-methyl-3''-amino-4''-methoxybenzene. After half an hour's developing the cotton is rinsed, soaped in a boiling bath, again rinsed and dried. A greenish-black of good fastness to boiling and chlorine and excellent fastness to light is thus obtained. The dyestuff corresponds to the following formula:

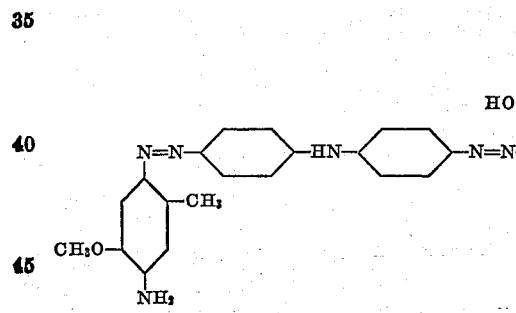

In an analogous manner cotton impregnated according to the directions given in paragraph 1 of this example yields with diazotized:

1,4-dimethoxy-2-benzoylamino-5-aminobenzene _____Greenish-blue
5-chloro-2-amino-1-methylbenzene _____Bluish-red
1-amino-2-chlorobenzene _____Dull red
1-amino-3-chlorobenzene _____Dull red
1-amino-2-nitrobenzene _____Bluish-red
1-amino-3-nitrobenzene _____Red
1-amino-2,5-dichlorobenzene _____Bluish-red
1-amino-2-methylbenzene _____Bluish-red
1-amino-4-nitrobenzene _____Dull red
1-amino-2-methyl-5-chlorobenzene __Bluish-red
1-amino-2-methoxy-4-nitrobenzene ____Corinth
1-amino-4-benzoylamino-2-methoxy-5-methylbenzene _____Bluish-violet
1-amino-4-benzoylamino-2,5-diethoxybenzene _____Greenish-blue
4'-methoxy-4-amino-diphenylamine _____Bluish-grey
4-amino-2,5-dimethoxyazobenzene _____Bluish-black
1-amino-4-phenylamino-2-chloro-5-methoxybenzene_____Bluish-corinth In an analogous manner naphtho-7'-hydroxy-6'-carbonyl-(1''-amino-2''-methylbenzene)-(1',2',5,4)-2-methylthiazole of the formula:

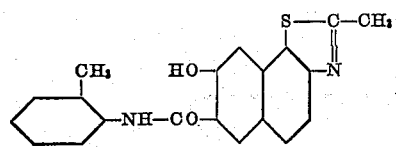

yields with diazotized:

1-amino-2-chlorobenzene _____ Red
1-amino-3-chlorobenzene _____ Red
1-amino-2-nitrobenzene _____ Bluish-red
1-amino-2-methylbenzene _____Bluish-red
1-amino-2-methyl-3-chlorobenzene _____Red
1-amino-4-nitrobenzene _____ Bordeaux
1-amino-2-methyl-5-chlorobenzene __ Bluish-red
1-amino-2-nitro-4-methylbenzene ___Bluish-red
1-amino-2-nitro-4-methoxybenzene _____Bluish-Bordeaux
4-amino-2-methyl-2'-methylazobenzene _____Corinth
4-amino-4'-methoxydiphenylamine _____Greenish-blue
4-amino-diphenylamine-4'-azo-1-methyl-3-amino-4-methoxybenzene _____Greenish-blackish-blue

*Example 5.*—38.4 grams of naphtho-7'-hydroxy-6'-carbonyl-1''-aminonaphthalene-(1'.2'-.5.4-)-2-methylthiazole are dissolved in 150 grams of pyridine. Thereto is added a diazo solution which has been prepared from 14.3 grams of α-naphthylamine. On adding water to the solution, the dyestuff of the formula:

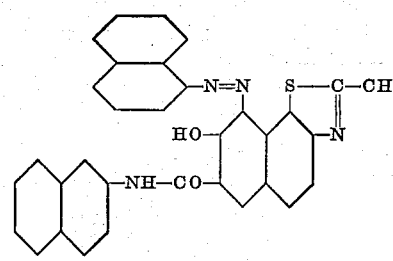

separates. After washing and drying it is obtained as a bluish-violet powder.

*Example 6.*—5 grams of naphtho-7'-hydroxy-6'-carbonyl-(1''-amino-4''-methylbenzene)-(1'.2'.5.4-)-2-phenylthiazole are dissolved in the usual manner with the aid of caustic soda and some hot water, and the solution is made up with water to one litre. 50 grams of cotton are impregnated with this solution for half an hour, squeezed and, without drying, introduced for about half an hour into a developing bath prepared in the usual manner from 1.47 grams of m-chloro-aniline. After rinsing, soaping in a boiling bath, again rinsing and drying, there is obtained a clear reddish-orange. The dyestuff corresponds to the following formula:

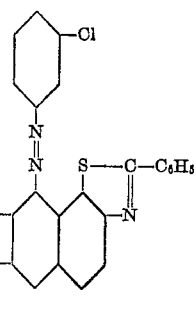

I claim:
1. Waterinsoluble azodyestuffs of the general formula:

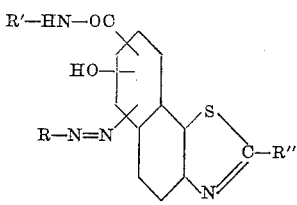

wherein R stands for a radical of the aromatic series, R' stands for a radical of the benzene or naphthalene series, R" stands for alkyl or for a radical of the aromatic series, and wherein the group —N=N—R is attached to the naphthalene nucleus in the 5- or 8-position, the hydroxy group standing in ortho-position to the group —N=N—R, and the group —CO—NH—R' standing in ortho-position to the hydroxy group, yielding, when produced on the fibre, generally yellow to red to blue to black shades of good fastness to light.

2. Water insoluble azodyestuffs of the general formula:

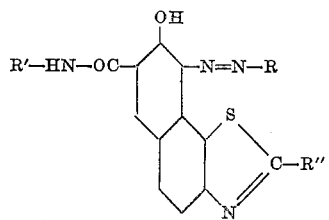

wherein R stands for a radical of the aromatic series, R' stands for a radical of the benzene or naphthalene series, R" stands for alkyl or for a radical of the aromatic series, yielding, when produced on the fibre, generally yellow to red to blue to black shades of good fastness to light.

3. Waterinsoluble azodyestuffs of the general formula:

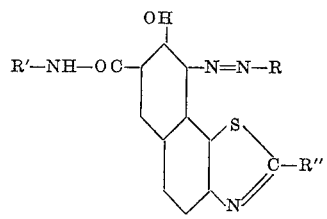

wherein R and R' stand for radicals of the benzene or naphthalene series, R" stands for alkyl or for a radical of the benzene or naphthalene series, and wherein R, R' and R" may bear substituents selected from the group consisting of alkyl, alkoxy, halogen, the nitro group, an acylamino group and an arylamino group, yielding, when produced on the fibre, generally yellow to red to blue to black shades of good fastness to light.

4. Waterinsoluble azodyestuffs of the general formula:

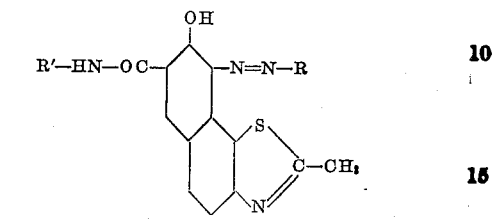

wherein R and R' stand for radicals of the benzene or naphthalene series, and wherein R and R' may bear substituents selected from the group consisting of alkyl, alkoxy, halogen, the nitro group, an acylamino group and an arylamino group, yielding, when produced on the fibre, generally yellow to red to blue to black shades of good fastness to light.

5. The waterinsoluble azodyestuff of the following formula:

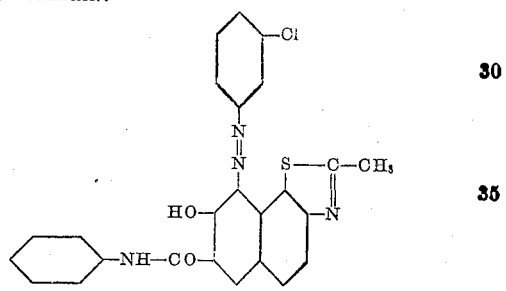

yielding. when produced on the fibre, red shades of good fastness to light.

6. The waterinsoluble azodyestuff of the following formula:

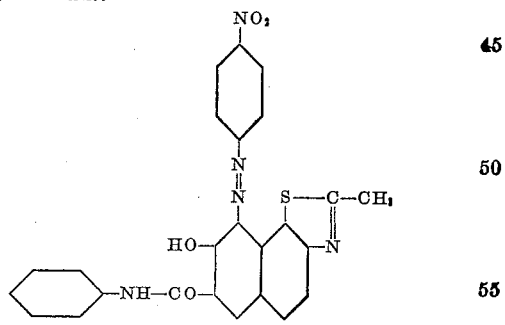

yielding, when produced on the fibre, Bordeaux shades of good fastness to light.

7. Fibre dyed with a dyestuff as claimed in claim 1.
8. Fibre dyed with a dyestuff as claimed in claim 2.
9. Fibre dyed with a dyestuff as claimed in claim 3.
10. Fibre dyed with a dyestuff as claimed in claim 4.
11. Fibre dyed with the dyestuff as claimed in claim 5.
12. Fibre dyed with the dyestuff as claimed in claim 6.

GERHARD SCHRADER.